(No Model.)
W. E. WAGNER.
LEVER HANDLE FOR AGRICULTURAL IMPLEMENTS.
No. 371,393. Patented Oct. 11, 1887.
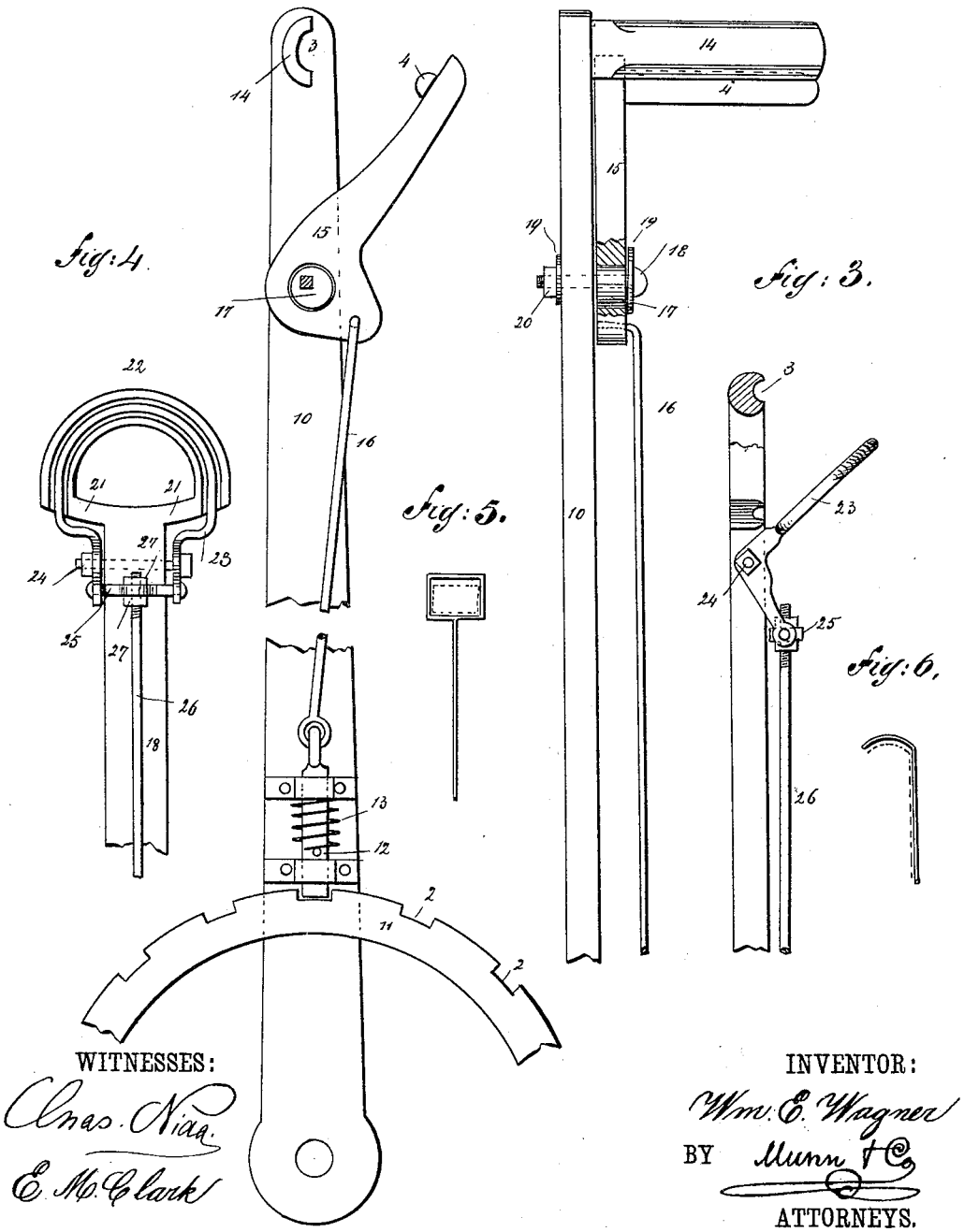

UNITED STATES PATENT OFFICE.

WILLIAM E. WAGNER, OF SHERIDAN, WYOMING TERRITORY.

LEVER-HANDLE FOR AGRICULTURAL IMPLEMENTS.

SPECIFICATION forming part of Letters Patent No. 371,393, dated October 11, 1887.

Application filed July 28, 1887. Serial No. 245,519. (No model.)

*To all whom it may concern:*

Be it known that I, WILLIAM E. WAGNER, of Sheridan, in the county of Johnson and Territory of Wyoming, have invented a new and Improved Ratchet or Bolt Lever-Handle, of which the following is a full, clear, and exact description.

This invention relates to ratchet or bolt levers of the class commonly employed as lifting-levers on agricultural implements; and the invention consists, essentially, of a lever provided with a handle which extends at substantially right angles to the length of the lever, said lever being provided with a bolt or ratchet trigger having a handle which extends in a line that is substantially parallel with that of the lever-handle, the arrangement being such that in throwing the lever proper the trigger-handle may be held against the lever-handle without undue strain or exertion upon the part of the operator.

Reference is to be had to the accompanying drawings, forming a part of this specification, in which similar figures of reference indicate corresponding parts in all the views.

Figure 1 is a side view of a lever constructed in accordance with the terms of my invention, the trigger-retaining plate being removed and the retaining-bolt employed in connection with the plate being shown in section. Fig. 2 is an edge view of the lever, the lower portion of the bolt-trigger being broken away and shown in section. Fig. 3 is an edge view of a modified construction, a portion of the handle being shown in section. Fig. 4 is a side or face view of the construction illustrated in Fig. 3, and Figs. 5 and 6 are diagrams illustrating modified constructions.

In the drawings above referred to, 10 represents a lever which is arranged in connection with a circular bar, 11, which bar is formed with ratchet-teeth or with recesses 2, that are arranged to be entered by a bolt, 12, that is carried by the lever, the bolt being normally held depressed by a spring, 13, arranged as shown. To the upper end of the lever 10, I connect a handle, 14, which, in the construction illustrated in Figs. 1 and 2, extends at right angles from one of the side faces of the lever, the handle extending in a line parallel with that of the fulcrum or pivot-bolt upon which the lever is mounted.

Beneath the handle I mount a bolt-trigger, 15, which is connected with the bolt 12 by a rod, 16, and in order that the bolt may be adjusted to operate properly in connection with the recessed bar 11, I support the trigger 15 upon an eccentrically-mounted stud, 17, said stud being held to the lever by a bolt, 18, which is formed with a squared shank, as illustrated in Fig. 1, upon which the stud 17 is mounted, washers 19 being arranged as shown, and the bolt being held in place by a nut, 20. By this arrangement it will be seen that by loosening the nut and turning the bolt the trigger may be moved toward or from the bolt, and a proper adjustment may be obtained. The trigger 15 is provided with a handle, 4, which extends outward from the trigger in a line that is substantially parallel to that occupied by the handle 14.

In Figs. 3 and 4 I illustrate a construction wherein the handle of the lever 10 is carried by arms 21, which extend outward from the upper end of the lever, the handle proper (shown at 22) being joined to or made integral with these arms and extending in a circular line above the top of the lever, but still so that in grasping the lever the whole will be in a line that is substantially at right angles to the length of the lever. Beneath the arms 21 I mount a trigger, 23, which is held to the lever by a bolt, 24, and between the lower and outwardly-extending arms of the lever I pivot a bolster, 25, that is centrally apertured and threaded, in order that it may be engaged by the upper threaded end of a connecting-rod, 26, said connecting-rod being held against displacement by nuts 27, that are brought into engagement with the rod, the one above and the other below the bolster. The lever-handles are recessed, as shown at 3, said recesses being adapted to receive the trigger-handles.

With such a lever as has been described the operator's hand may at all times be in a natural and comfortable position, for as the trigger-handle is brought into the recess of the lever-handle it is not liable to slip from the grasp of the operator; but as the main handle is heavier and larger than the trigger-handle, and as said trigger-handle works on an exceedingly short radius, the trigger-handle may be released at any time desired.

The circular-topped handle illustrated in Fig. 4 is particularly adapted to handles placed at a distance to one side of the operator, as a good hold is obtained when grasped to one side of the center.

In Fig. 5 I illustrate a construction wherein the handle is inclosed and extends across the top of the lever, while in Fig. 6 the construction is the same as that illustrated in Figs. 1 and 2, except that the handle is slightly curved.

The advantages arising from the use of such a lever as the one above described in positions where the lever describes an arc from a point on a level or above the operator's shoulder to a point below and behind the operator, or vice versa, or in positions where the strain required to operate the lever changes from a pull to a push, or vice versa, will be readily appreciated by those having had occasion to employ the ordinary form of lever in the positions above referred to.

Having thus fully described my invention, I claim as new and desire to secure by Letters Patent—

1. The combination, with an operating-lever provided with a handle which extends at substantially right angles to the length of the lever, of a bolt-trigger having a handle which extends in a line substantially parallel with that of the lever-handle.

2. The combination, with an operating-lever provided with a handle which extends outward from one side of the lever at substantially right angles to the length of the lever, of a bolt-trigger having a handle which extends in a line substantially parallel with that of the lever-handle.

3. The combination, with an operating-lever provided with a handle which extends at substantially right angles to the length of the lever, of a bolt-trigger having a handle which extends in a line substantially parallel with that of the handle, and a trigger-adjusting mechanism, substantially as described.

4. The combination, with a lever, of a handle which extends outward from one side thereof, a bolt-trigger provided with a handle which extends in a line substantially parallel with that of the lever-handle, an eccentrically-mounted stud upon which the bolt-trigger is mounted, and a bolt by which said stud is adjustably connected to the main lever, substantially as described.

WILLIAM E. WAGNER.

Witnesses:
THOS. M. COTTON,
T. H. SWAIM.